G. J. HESS.
PRESS FOR TYING CURRENCY.
APPLICATION FILED MAY 14, 1915.

1,197,824.

Patented Sept. 12, 1916.
2 SHEETS—SHEET 1.

WITNESSES:

INVENTOR
George J. Hess
BY
Attorney

G. J. HESS.
PRESS FOR TYING CURRENCY.
APPLICATION FILED MAY 14, 1915.
1,197,824.
Patented Sept. 12, 1916.
2 SHEETS—SHEET 2.
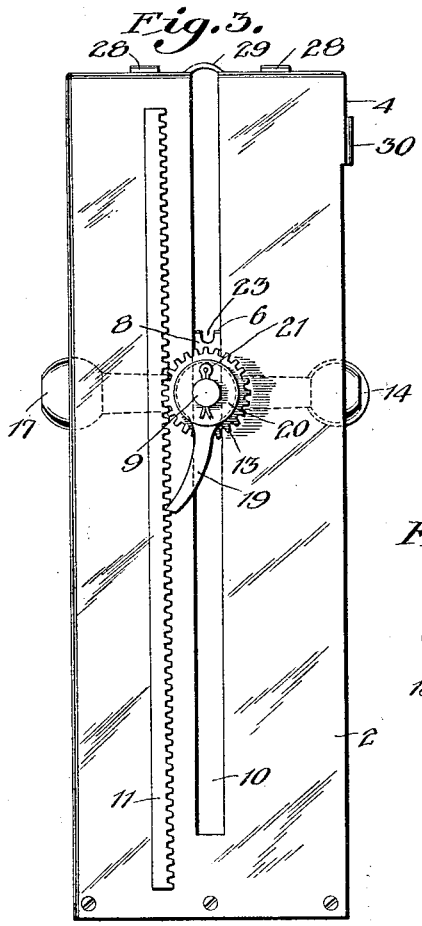
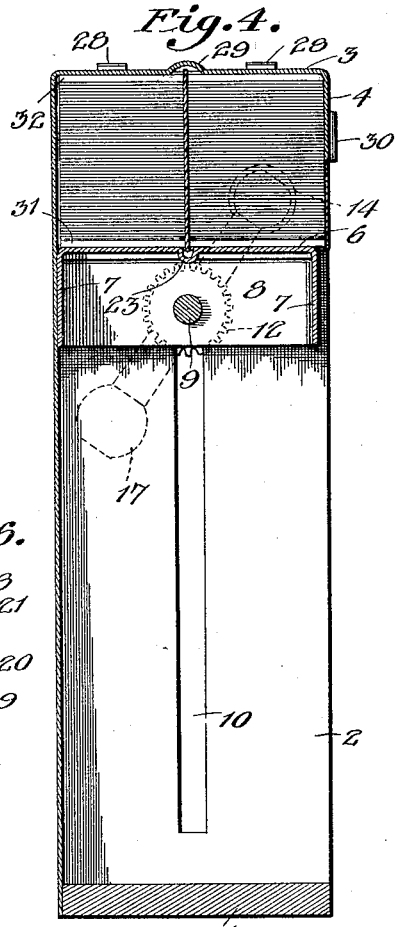
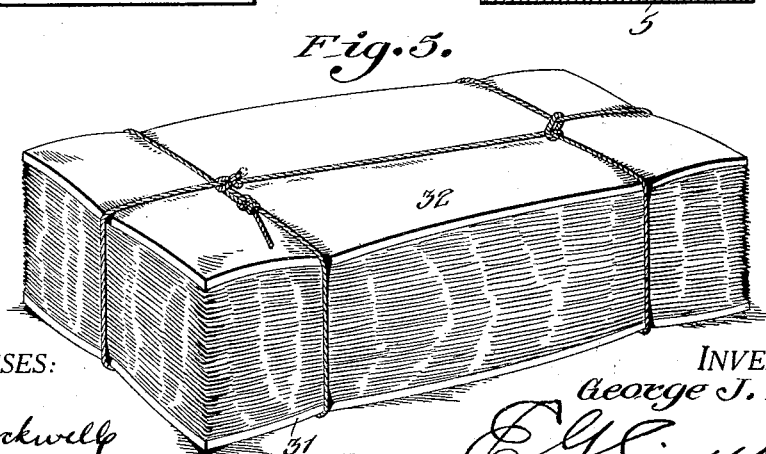
WITNESSES:
INVENTOR
George J. Hess
BY
Attorney

UNITED STATES PATENT OFFICE.

GEORGE J. HESS, OF CARROLL, IOWA.

PRESS FOR TYING CURRENCY.

1,197,824.　　　　　Specification of Letters Patent.　　Patented Sept. 12, 1916.

Application filed May 14, 1915. Serial No. 28,092.

*To all whom it may concern:*

Be it known that I, GEORGE J. HESS, citizen of the United States, residing at Carroll, in the county of Carroll and State of Iowa, have invented a new and useful Press for Tying Currency, of which the following is a specification.

This invention relates to an improvement in presses and the object is to provide means for compressing currency, checks, drafts, certificates of deposit, cashiers' checks, invoices and the like, for the purpose of tying them in bundles.

A further object is in the provision of means for so mounting the plunger or piston to insure the locking means carried by the plunger or piston to act for the purpose of holding the piston or plunger at the desired elevation when the elevating mechanism has moved the piston to the proper elevation and is stopped.

Another object is in providing the piston or plunger with suitable grooves, and the casing with suitable grooves and slots whereby a cord may be passed around the article for the purpose of tying the article in the press.

The invention consists of certain novel features of construction and combination of parts which will be hereinafter described and pointed out in the claims.

Figure 1:
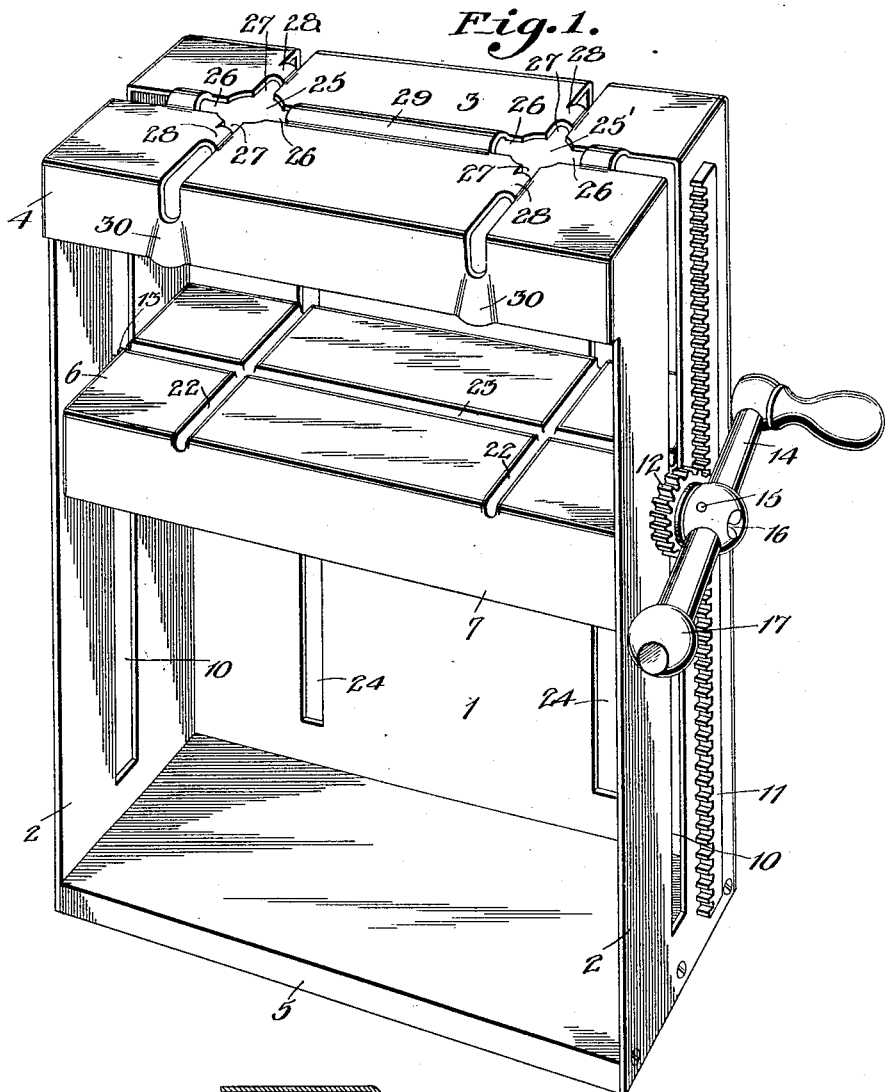
Figure 2:
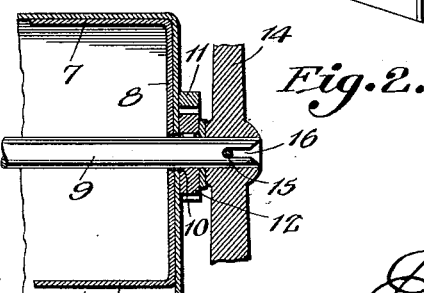

In the accompanying drawings, Figure 1 is a perspective view of the apparatus disclosing the invention. Fig. 2 is a horizontal detail sectional view through an end of the casing and piston. Fig. 3 is a view in end elevation. Fig. 4 is a transverse vertical sectional view, and Fig. 5 is a perspective view of the tied bundle. Fig. 6 is a detail sectional view showing the manner of mounting the pawl.

The casing consists of a side 1, ends 2 and top 3. A flange 4 extends downwardly from the top 3 and across the open side of the casing. A base 5 is connected to the ends 2 and side 1, forming a suitable support for the casing. A piston or plunger is mounted within the casing and consists of a top 6 and side and end flanges 7 and 8, respectively.

A shaft 9 extends through the end flanges 8 of the plunger and through vertical slots 10 formed in the ends 2 of the casing. Connected to the exterior sides of the ends 2 of the casing are vertical rack bars 11. Mounted upon the shaft 9 are gears or pinions 12 and 13 which are keyed or splined to the shaft 9. Teeth of the pinions 12 and 13 are adapted to mesh with the teeth of the rack bars 11 causing the elevation of the plunger upon the rotation of the shaft. A suitable handle 14 is mounted upon the shaft 9 and is connected thereto by means of a pin 15 which passes through a bifurcation 16 in the shaft 9.

A weight 17 is formed on one end of the handle to assist in raising and lowering the plunger. The gear 13 is provided with a hub 18 upon which is mounted a gravity pawl 19. A washer 20 is mounted on the end of the shaft and a cotter pin 21 passes through the shaft 9 for maintaining the washer upon the shaft so that the pawl will be held in position upon the hub 18.

The surface or top of the plunger is provided with transverse grooves 22 and a longitudinal groove 23, the longitudinal groove communicating with the vertical slots 10 of the ends 2 of the casing. The side 1 of the casing is provided with vertical slots 24 which are in communication with the transverse slots 22 of the plunger.

The top portion 3 of the casing is provided with circular openings 25 and 25' and radiating from the openings are slots 26, 27, the slots 27 extending transversely of the top portion and the slots 26 extending longitudinally thereof. The top portion 3 is provided with ridges 28, 29, having grooves on their undersides which communicate with the various slots, the grooves of ridges 28 communicating with the slots 27 and 24, while the grooves of the ridges 29 communicate with the slots 26 and 10. The flange 4 of the top portion is provided with groove ridges 30 which communicate with the slots 27.

Bank notes or other papers to be tied are placed upon the plunger 6, after a suitable backing 31 has first been placed upon the plunger. After the desired number of bills or other papers have been placed upon the plunger a similar backing 32 is applied. The handle 14 is now rotated, causing the gears 12 and 13 to rotate and travel along the rack bars 11, for the purpose of compressing the bills or papers between the top 3 of the casing and the plunger. Upon obtaining the desired compression the handle 14 is released sufficiently to allow the gravity pawl 19 to come into engagement with a tooth of one of the rack bars 11. This gravity pawl may be located upon either end of the shaft but I have disclosed it as being mounted upon the gear hub. The cord or twine is now wrapped around the notes or bills or the like by inserting a needle or other instrument through the various grooves and slots of the plunger and casing. An end of the cord is held at the opening 25 and the twine is then fed through a slot 27 and through one of the the transverse slots 22, and back to the central opening 25 where the twine is tied. It is then carried over an end of the bundle through slots 26 and 10, and through the longitudinal groove 23 of the plunger 6, and thence through the slot 10 in the opposite end of the casing to the opening 25'. The cord or twine is then passed transversely around the bundle and back to the opening 25', where the cord is tied, and then the cord is passed beneath the ridge 29 and tied to the cord at the first mentioned opening 25.

The flange 4 forms a guide for the bills or notes during the compression of the bills or notes between the top 3 of the casing and the plunger. The groove ridges 30 of the flange form enlarged passages between the flange 4 and the flange 7 of the plunger so that the cord may be passed between the flange 7 and flange 4 when necessary, or between the notes or bills and the flange 4.

It will be noted from the drawings that the casing and the plunger may both be formed from sheet metal, the various ridges 28 and 30 providing for an integral structure. The slots may be cut from sheet metal, and at the same time the ridges may be stamped therefrom, so as to provide for a free channel or passage about the papers when compressed between the plunger and casing, and at the same time provide for a reinforcement for joining the parts which would otherwise be separated or weakened by the provision of slots therebetween. In a structure such as is herein set forth, the parts are not weakened by the provision of the channels or grooves to receive the twine, but on the other hand, the formation of these channels or grooves provide beads which reinforce and strengthen the casing and the plunger against buckling or crushing when submitted to pressure.

From the foregoing it will be seen that applicant has provided a very simple construction for pressing bills, notes and other papers into compact form, so that they may be tied while in the press, and upon the completion of the tying operation the gravity pawl 19 can be disengaged and the teeth of the rack bar 11 and the plunger allowed to descend so that the bundle can be removed. The apparatus may also be used upon the counter in a bank or other institution, whereby loose bills may be held in the press instead of being left loose in a drawer as is generally the custom, and when it is desired to obtain the bills from the press the pawl 19 can be released and the plunger will be lowered so that the bills will be accessible.

What is claimed is—

1. A press including a sheet metal casing stamped and cut to provide vertical slots in its walls and transverse and longitudinal slots in its top, said casing also having ridges spanning the slots to reinforce the casing, a sheet metal plunger mounted for vertical movement within the casing and having depending reinforcing flanges at its end and lateral edges, the plunger being stamped to provide longitudinal and transverse grooves in its upper face, all of said slots and grooves of the casing and the plunger registering to provide free channels transversely and longitudinally about the package compressed within the casing, and means for operating the plunger to move the same longitudinally in the casing.

2. In a press, the combination with a casing having vertical slots, rack bars fixed to the casing and located adjacent to the slots, of a plunger movably mounted in the casing, a shaft carried by the plunger and extending through the slots of the casing, pinions mounted on the shaft adapted to mesh with the rack bars, means for rotating the shaft for elevating the plunger, a gravity pawl mounted on the shaft adapted to automatically engage the tooth of one of the rack bars for holding the plunger in its elevated position, and means for maintaining the pawl upon the shaft.

3. In a press, the combination with a casing having vertical rack bars in its opposite sides, a plunger vertically movable in the casing, a shaft rotatably mounted upon the plunger and projecting at its opposite ends through the sides of the casing for vertical movement therein, a gear on each end of the shaft for engagement with the adjacent rack bar, and a gravity pawl carried upon the end of the shaft for engagement with the adjacent rack bar to hold the plunger in elevated position when released.

4. In a press, the combination with a casing consisting of a side, ends, and a top, said side and ends provided with vertical slots, and the top provided with central openings from which radiate slots communicating with the vertical slots of the ends and side, of a plunger movably mounted within the casing for compressing articles between said plunger and the top of the casing, said plunger provided on its upper surface with longitudinal and transverse grooves which communicate with the vertical slots of the ends and sides of the casing, whereby cord or twine may be fed through the grooves and slots of the plunger and casing for tying the bundle or articles confined between the plunger and casing.

5. In a press, a casing comprising a side, ends, and a top, said side and ends having vertical slots therein, the top having longitudinal and transverse slots registering with the respective vertical slots of the side and ends, a plunger movable vertically in the casing and having longitudinal and transverse grooves in its upper face communicating with the vertical grooves of the side and the ends of the casing, and registering vertically with the longitudinal and transverse slots in the top of the casing, a rack on each end of the casing adjacent the edge of the vertical slot therein, a shaft journaled on the plunger and projecting at its ends through the vertical slots in the ends of the casing, a gear on each end of the shaft meshing with the adjacent rack bar, a handle on one end of the shaft for rotating the same to feed the gears upwardly on the rack bars and elevate the plunger, and a gravity actuated pawl carried by the shaft for engagement with one of the rack bars to lock the plunger from falling upon the release of the handle.

6. A press comprising a sheet metal casing stamped to provide vertical slots in its walls and transverse and longitudinal slots in its top, said casing also having ridges spanning the slots to reinforce the casing, a sheet metal plunger vertically movable within the casing, and having depending reinforcing flanges at its end and lateral edges, and stamped to provide longitudinal and transverse grooves in its upper face, all of said slots and grooves of the casing and the plunger registering to provide free channels transversely and longitudinally about the package compressed within the casing, a rack bar on each end of the casing adjacent the vertical slots therein, a shaft journaled in the plunger and projecting at its opposite ends through vertical slots, a gear on each end of the shaft meshing with the adjacent rack bar, a handle on the shaft for turning the same to feed the gears upwardly on the rack bar and elevate the plunger, and a pawl pivoted upon one end of the shaft, and having its extremity in alinement with the adjacent rack bar, whereby said pawl is adapted to engage the rack bar upon the retrograde movement of the plunger to retain the same in elevated position.

In testimony, that I claim the foregoing as my own, I have hereto affixed my signature in the presence of two witnesses.

GEORGE J. HESS.

Witnesses:
J. P. HESS,
T. P. BERGER.

Copies of this patent may be obtained for five cents each, by addressing the "Commissioner of Patents, Washington, D. C."